United States Patent
Pidgeon

Patent Number: 5,153,763
Date of Patent: Oct. 6, 1992

[54] CATV DISTRIBUTION NETWORKS USING LIGHT WAVE TRANSMISSION LINES

[75] Inventor: Rezin Pidgeon, Atlanta, Ga.

[73] Assignee: Scientific-Atlanta, Inc., Atlanta, Ga.

[21] Appl. No.: 444,598

[22] Filed: Dec. 1, 1989

[51] Int. Cl.$^5$ ............................................. H04J 14/02
[52] U.S. Cl. .................................. 359/125; 359/133; 358/86
[58] Field of Search .............. 370/3; 358/86; 455/612, 455/5, 617; 359/124, 125, 127, 133

[56] References Cited

U.S. PATENT DOCUMENTS

| | | | |
|---|---|---|---|
| 3,535,640 | 6/1966 | Forrest, Jr. | 358/86 |
| 3,704,419 | 11/1972 | Rheinfelder | 358/86 |
| 4,709,418 | 11/1987 | Fox et al. | 358/86 |
| 4,748,689 | 5/1988 | Mohr | 370/3 |
| 4,891,694 | 1/1990 | Way | 370/3 |
| 4,959,862 | 9/1990 | Davidov et al. | 358/86 |

OTHER PUBLICATIONS

"Fiber Optics, Technology and Applications", S. D. Personick (1985 Plenum Press, NY) pp. 194-223.
"AM Transmission on Fiber", Larry Stark, Communications Engineering and Design, Apr., 1988, pp. 20-34.
Bertelsmeier and W. Zschunke, "Linearization fo Broadband Optical Transmission Systems by Adaptive Predistotion", Frequenze 38 (1984) pp. 206-212.
K. Asatani and T. Kimura, "Linerization of LED Nonlinearity by Predistortions", IEEE Transactions on Electron Devices, vol. ED-25 #2, Feb. 1978, pp. 207-212.
Proceedings of the Fiber Optics Seminar, SCTE, Ja. 18-20, 1988.
R. A. Loff, Communications Engineering & Design, Feb., 1989, pp. 35 & 36.

Primary Examiner—Edward L. Coles, Sr.
Assistant Examiner—Kinfe-Michael Negash
Attorney, Agent, or Firm—William A. Marvin

[57] ABSTRACT

Light wave communication over optical fiber networks for the distribution of broadband, multiple channel CATV (Cable Televison) signals uses fibers which carry amplitude modulated broadband signals over a considerable distance (6-30 km) to a fiber node. Electrical to optical transmitters at the head end and optical to electrical receivers at the fiber node launch and receive the optical signals corresponding to the broadband CATV electrical signals. Distribution from the fiber node to subscribers is obtained by transmitting the electrical signals from the receivers at the node through a limited cascade of amplifiers along an electrical transmission line (coax cable). The limited cascade is much shorter than the fiber span and includes trunk amplifiers which are insufficient in number to add significant losses or distortion. Line extender amplifiers may be connected to output couplers located off the subscribers premises and then via electrical cables to the subscribers. In order to reduce distortion (second order distortion) which may be due to nonlinearities and interactions of signals in the transmitter, fiber and receiver, all or a portion of the spectrum which contains the lower channels is translated (block converted) to a frequency range which covers less than an octave. The converted signal is applied as an RF modulating signal to the transmitter which may contain a laser diode, and provides an amplitude modulated output. The signals are received at the output end of the fibers (at the fiber node), retranslated to the original band and filtered so that second order distortion components are removed. The broadband CATV signal is then distributed to the subscribers. Only those channels which extend over more than an octave need be combined, translated to a band which does not extend more than an octave and then transmitted as an amplitude modulated optical signal over a fiber. One or more additional fibers are used for the channels in the upper portion of the band which is not converted. The optical signals from the fibers are received, the converted portion is retranslated back to its original frequency range and combined with the other band limited portions to provide a broadband signal for distribution to the subscribers.

4 Claims, 2 Drawing Sheets

CATV DISTRIBUTION NETWORKS USING LIGHT WAVE TRANSMISSION LINES

DESCRIPTION

The present invention relates to CATV (Cable Television) distribution systems which utilize optical or light wave communication links where such light wave communication links may be provided by one or more optical fibers, and particularly to fiber optic CATV distribution networks which facilitate the distribution of broadband CATV signals while minimizing distortion thereof so as to improve the quality and definition of the television pictures provided by these signals to CATV subscribers.

The present invention is especially adapted for use in CATV distribution systems in which AM (Amplitude Modulated) optic signals are generated and transmitted over optical fibers. Aspects of the system will be applicable in networks for the optical communication of broadband signals regardless of how they are modulated (AM, FM or otherwise).

In the distribution of broadband CATV signals, the principal requirement is that the distribution system be transparent for as long a distance as possible between the head end and the subscribers. Light wave communications over optical fibers has been suggested for use in broadband networks for distribution of various types of signals and analog techniques, particularly amplitude modulation, have been proposed. See the text entitled "Fiber Optics, Technology and Applications" by Stewart D. Personick (1985 Plenum Press, New York), especially chapters 10 and 11. In optical transmission over fibers, the signals are subject to distortion, particularly harmonic distortion, which is introduced in the laser diode modulator which produces the AM signals, the photo detector in the receiver which receives these signals and in the fiber cable itself. Problems due to distortion are discussed in an article entitled "AM Transmission on Fiber" by Larry Stark which appeared in Communications Engineering and Design, April 1988, pages 20-34. The nature of the distortion is discussed in the above cited text by S. D. Personant and in articles concerned with the linearization of the optical transmitters in order to overcome distortion by the use of predistortion. See M. Bertelsmeier and W. Zschunke, "Linearization of Broadband Optical Transmission Systems by Adaptive Predistortion", Frequenze, 38 (1984), pages 206-212 and K. Asatani and T. Kimura, "Linearization of LED Nonlinearity by predistortions", IEEE Transactions on Electron Devices, Vol. ED-25, No. 2, February, 1978, pages 207-212.

It has been suggested to segregate the CATV signal into segments. See, Proceedings of the Fiber Optics Seminar, sponsored by the SCTE (Society of Cable Television Engineers) in Orlando, Fla., Jan. 18-20, 1988. Mention of band splitting is contained in an article by R. A. Luff which appeared in Communications Engineering and Design, February, 1989 especially at pages 35 and 36. In addition to the increased cost of additional fiber links for each of the bands, such band splitting does not eliminate second order intermodulation distortion unless each band is less than one octave.

It has been discovered in accordance with the invention that distribution of multi-channeled broadband CATV signals with minimum loss and distortion (transparency) can be obtained by arranging the fiber span between the head end (or a hub in communication with a head end) and a node, the optical transmitter being located at the head end or hub and the receiver of the optical signal being located at the node. The node is followed by a limited cascade of trunk amplifiers and/or line extenders. The term, limited, means that the length of the cascade of amplifiers and interconnecting transmission line (coax cable) is much shorter than the fiber span. The use of the limited cascade does not significantly affect the transparency of the distribution network since the fiber is devoid of trunk amplifiers and eliminates the 20 or more trunk amplifiers which were needed in the trunks connecting the head end to various chains of subscribers.

Distortion of the broadband CATV signal is reduced by block conversion of all or part of the broadband of CATV signals to a frequency range which is less than an octave. A portion of the spectrum is translated to this frequency range by translating means including mixers to which the portion of the spectrum is applied together with a local oscillator signal and band pass filters which transmit only the converted or frequency shifted portion of the spectrum of the broadband signal. This broadband signal is applied as an RF modulating signal to the optical transmitter (laser diode) of the optical transmitter and transmitted over the fiber. The entire broadband signal, for example, from 54 to 550 MHz may be block converted, or only a portion thereof which would ordinarily cover more than an octave may be converted and translated to a band which does not cover an octave. In the latter case, the remaining channels are combined and transmitted without conversion by an optical transmitter connected to another fiber. The block converted signals received from the fiber are retranslated to the original band (54 to 550 MHz) whether a single fiber is used and the entire band is block converted or a part of the band is block converted and combined after down conversion with the signals which are transmitted over a second fiber (i.e., in either case), a broadband CATV signal containing all of the channels (from 54 to 550 MHz) is available for distribution to subscribers.

Accordingly, it is the principal object of the present invention to provide improved CATV distribution systems over optical communication links.

It is a further object of the present invention to provide improved CATV distribution systems which enable broadband CATV signals to be distributed as AM optical signals over optical communication (fiber optic) links without introducing significant harmonic and intermodulation distortion in the optical transmission, distribution, and detection of the signals.

The foregoing and other objects, features, and advantages of the invention, as well as presently preferred embodiments thereof, will become more apparent from the reading of the following description in which.

Figure 1:
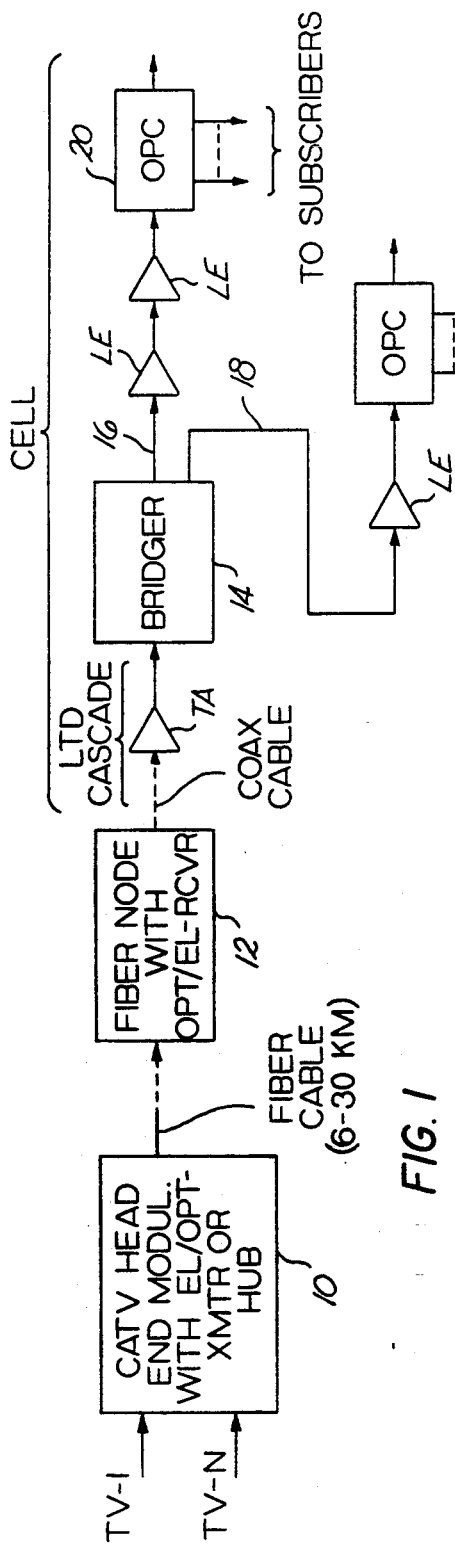
FIG. 1 is a block diagram of a fiber optic CATV network in accordance with the invention.

Referring to FIG. 1, there is shown a fiber optic CATV network. All of the cable channels, (TV-1 to TV-N), arrive at the head end and are converted to different channels in the frequency space or spectrum of the broadband CATV signal. This spectrum in conventional CATV equipment extends from 54 to 550 MHz. The broadband signal is obtained using combiners of the up converted TV signals and applied to an electro-optical transmitter 10 (EL/OPT-XMTR). This transmitter includes a laser diode which is biased in its stimulated emission (lasing) mode by passing a DC bias current of sufficient amplitude there through. This current is modulated with the RF broadband multi-channel CATV signal. In other words, a frequency multiplexed AM signal is generated and transmitted or launched into one end of the fiber.

The fiber may be one or more fibers in a fiber optic cable. The laser diode is optically coupled to the fiber and transmits the light wave or optical signal. The broadband multi-channel CATV signal, a frequency multiplexed signal with each channel in a different, successive frequency band, say 6.0 MHz wide. This broadband signal is preferably processed using the block conversion system illustrated in FIG. 2 or in FIG. 3 which will be discussed hereinafter. The fiber cable contains several optical fibers which are preferably single mode fibers operating at a wave length of 1.3 or 1.55 microns. The fiber cable is usually at least 6 kilometers (km) long and may be as long as 30 km. At the down link end of the cable, the fibers are terminated at a fiber node 12.

Each fiber is provided with its own Opto-electric receiver (OPT/EL RCVR) at the node 12. The receiver includes a photo diode detector which provides an output current which varies in accordance with the amplitude modulation of the optical signal. Accordingly, a broadband signal is produced by the receiver containing each of the TV channels; the band being 54 to 550 MHz. The node 12 is connected to a cell of electrical transmission lines (preferably coaxial cable) which extends the network to the vicinity of the subscriber. This cell has a limited cascade of transmission lines with a few trunk amplifiers or one trunk amplifier (TA) as shown. This amplifier and cable which provides the limited cascade may, for example, be 1 km in length and connect the fiber node to a bridge to lines containing line extenders (LE) which deliver the broadband signal to the subscribers.

The bridger 14 connects several transmission lines, two of which 16 and 18 are shown. These lines contain one or more line extender amplifiers depending upon their length. The lines 16 and 18 terminate in output couplers which are disposed off premises (usually on the telephone pole) near the subscriber. Cables connect the output couplers 20 and 22 to the various subscribers.

The fiber cable provides an essentially transparent link. The transparency of this link is not degraded by the limited cascade, since the cascade contains very few trunk amplifiers. Also, a limited number of line extender amplifiers is needed to reach the subscribers. Thus, the entire network may be essentially transparent thereby allowing broad band width signals, even broader band width than now conventionally required so as to achieve the quality and definition of television which is generated in accordance to the emerging technologies, such as high definition television (HDTV).

Figure 2:
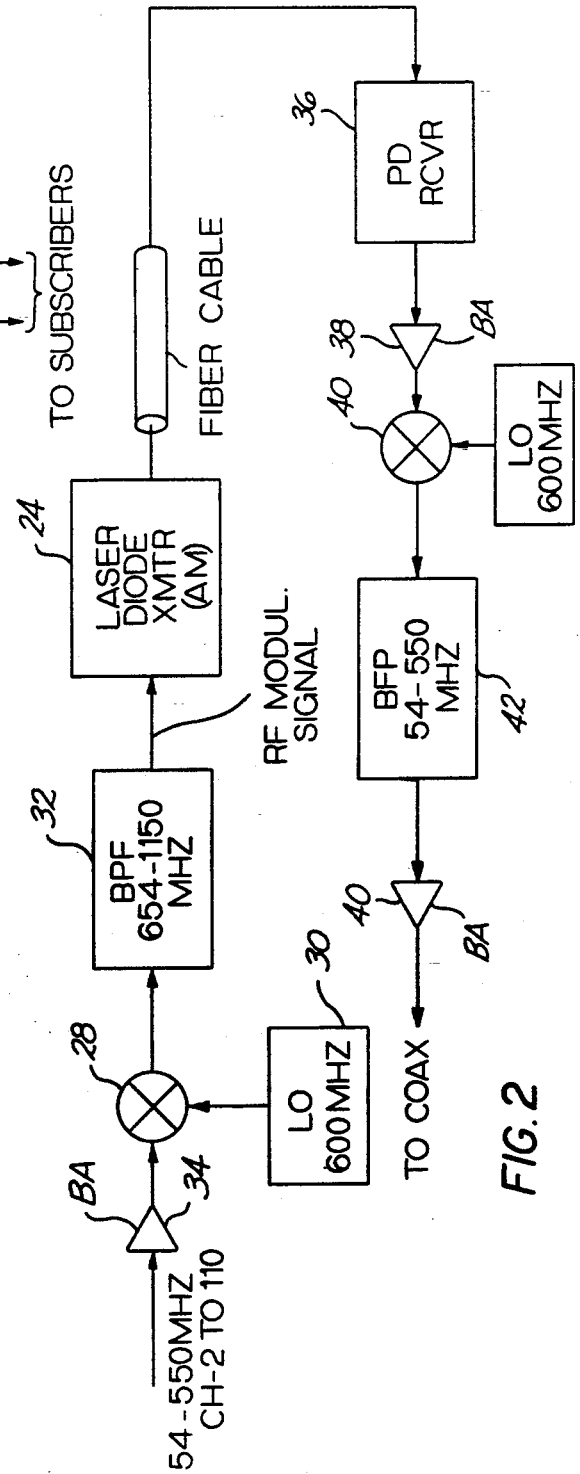
FIG. 2 is a block diagram of a portion of a fiber optic CATV network, which is provided in accordance with an embodiment of the invention, such as the portion in FIG. 1 which includes the fiber cable, the optical transmitter at the head end and the optical receiver at the fiber node, and having means for reducing harmonic distortion.

Referring to FIG. 2, there is shown a distortion reduction system which is provided at each end of the fiber cable. At the head end and as part of the head end equipment, before the laser diode AM transmitter 24 of that equipment, is a block converter which converts the entire broadband CATV spectrum to a frequency range where the lowest and highest frequency in that range differ by less than an octave. As shown in FIG. 2, a modulator 28 receives an offset frequency, preferrably in the gap between input and output bands, suitably 600 MHz, from a local oscillator 30. The upper side band 654 to 1150 MHz is passed by a band pass filter 32 and applied as the RF modulating signal to the laser diode transmitter 24. The entire band is applied to the modulator 28 by way of a buffer amplifier 34 in the head end 10 (FIG. 1). The fiber cable is in this embodiment a single optical fiber which extends across the entire span, for example, 6 to 30 km depending upon the distance to the subscribers location. The opposite end of the fiber is connected to a photo detector receiver 36 which provides an output signal. This signal may be a voltage covering the entire band upconverted to the 654 to 1150 MHz range. Since the band does not cover more than an octave, second order harmonics and intermodulation components will reside outside the band. The upconverted broadband signal may be translated into voltage rather than current variations by a transimpedance amplifier in the photo diode receiver 36. A buffer amplifier 38 connects the receiver to a mixer or modulator 40 and band pass filter 42 which retranslates the upconverted signals to the original 54 to 550 MHz spectrum. The band pass filter 42 passes only in-band signals, and harmonics are removed from the output of the filter. The output passes through a buffer amplifier 44 to the coax cable, which may be part of the limited cascade shown in FIG. 1.

Figure 3:
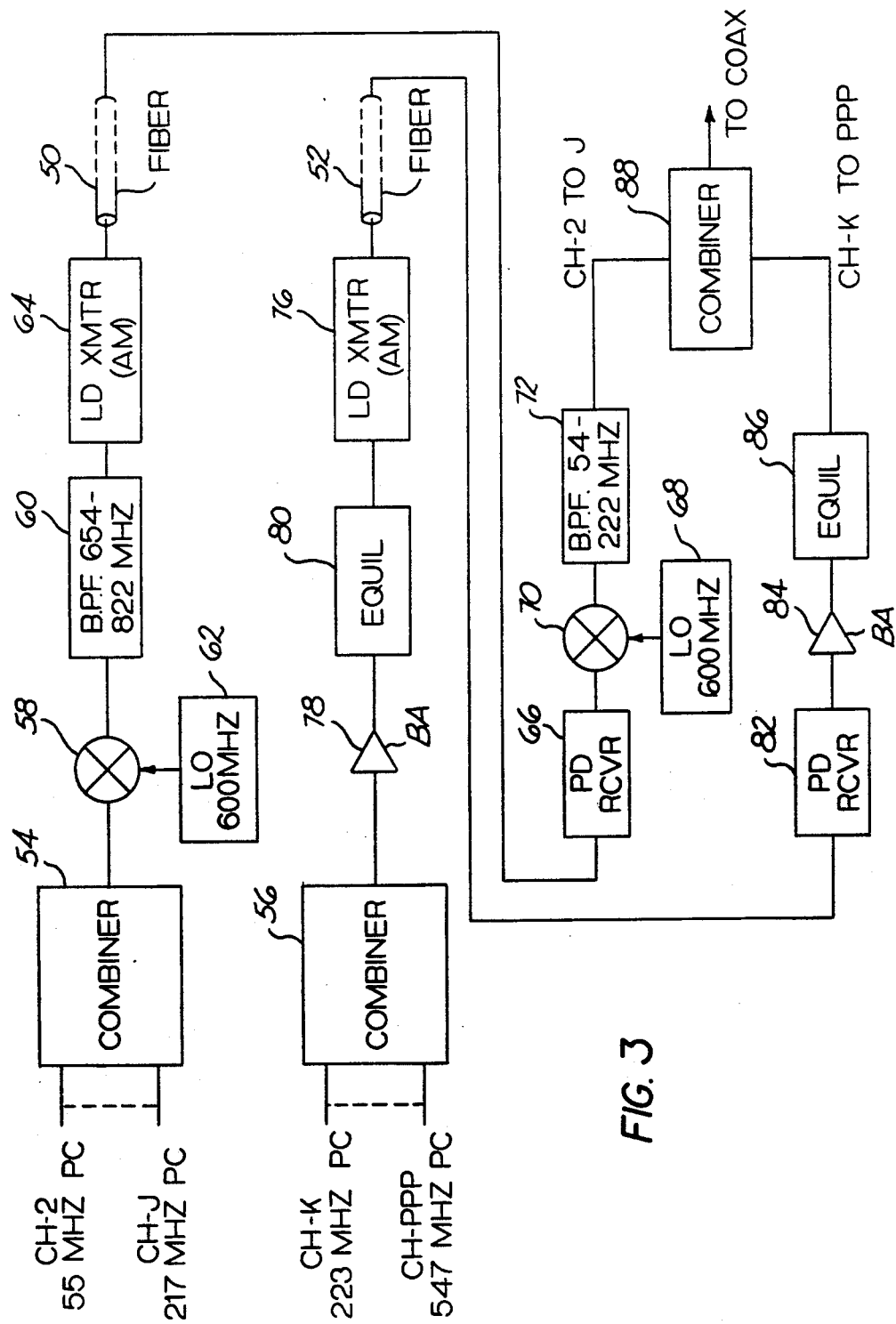
FIG. 3 is a portion of a fiber optic CATV network which utilizes two or more fiber links and in which harmonic distortion is reduced, and which is provided in accordance with another embodiment of the invention.

Referring to FIG. 3, there is shown a system using a plurality of fiber cables, number 50 and 52, which in this embodiment are two in number, although more may be used as discussed below. Each cable carries a different portion of the broadband multi-channel TV signal spectrum. In the head end, several of the channels, for example, channel 2 through channel J, which extends from 54 to 222 MHz, are combined in a combiner 54 in the head end. The other channels are also combined in another combiner 56. These channels extend from 222 to 552 MHz. There are, therefore, two blocks or signal spectrum portions from 54 to 222 MHz, which is more than an octave, and from 222 to 552 MHz which is slightly greater than an octave. If less than octave blocks are desired for the upper band portion, another fiber may be used (or the bandwidth of the lower band may be increased and that of the upper band decreased). In the interest of economy, the highband block may extend slightly above an octave in band width.

The lower frequency block is applied to a mixer or modulator 58 and upper side band filter 60 which together with a local oscillator 62 provides translating means which upconvert the block from 54 to 222 MHz to 654 to 822 MHz. Thus, the lower portion of the spectrum of the broadband CATV signal now lies in a less than an octave range. This upconverted broadband signal is applied to a laser diode AM transmitter 64 and launched into the fiber 50. At the node end of the fiber 50, there is a photodector receiver 66 and a retranslator which shifts the channel 2 to channel J TV signals back (to their original 54 to 222 MHz spectral range). This is accomplished by a local oscillator 68, which provides to the mixer signals at the same frequency, 600 MHz in the illustrated case, as the local oscillator 62. A mixer 70 similar to the mixer 58 is used. A band pass filter 72 excludes the second and higher order harmonic distortion components.

The other fiber 52 carries the combined channel K to PPP signals. The signals are launched into the other fiber 52 by an AM laser diode transmitter 76. A buffer amplifier 78 and equalizer 80 correct the gain and frequency response in the channel to the laser diode transmitter 76 so as it is equivalent to the gain and response in the channel to the laser diode 64. A photo-detector receiver 82 translates the optical signal from the fiber 52 into electrical form. Another buffer amplifier 84 and equalizer 86 adjusts the gain and the spectral response to substantially the same as provided by the frequency translator 68, 70 and 72 at the output of the photo diode receiver 66. A combiner 88, which may be an additive combiner similar to the other combiners used in this system, provides the overall broadband CATV signal containing channels 2 to PPP as obtained from the block which is translated in frequency (channels 2 to J) and the block which is not translated in frequency (channels K to PPP). This broadband signal may be applied to the coax cable in the limited cascade as shown in FIG. 1.

From the foregoing description, it will be apparent that there has been provided improved CATV fiber optic networks which enable high quality transmission of CATV broadband mult-channel signals from the head end of the CATV system to the subscribers while minimizing distortion. Variations and modifications in the herein described system within the scope of the invention will undoubtedly suggest themselves to those skilled in the art. According, the foregoing description should be taken as illustrative and not in a limiting sense.

I claim:

1. A CATV network for distributing broadband, multi-channel CATV signals from a head end or hub to subscribers, having means for frequency multiplexing individual TV channel signals into broadband electrical signals, which comprises:
    a) means at said head end or hub for providing light wave signals corresponding to said broadband electrical signals,
    b) a fiber node with optical electrical signal receiver means for converting said light wave signals to said broadband electrical signals,
    c) a fiber optic cable with opposite ends, one of said ends being supplied with light wave signals from said head end or hub, the other of said ends delivering said light wave signals to said fiber node,
    d) a cell to which a multiplicity of subscribers are connected,
    e) a transmission line of length much less than said optical cable, being the input of said cell, a cascade of amplifiers in said transmission line, one end of said transmission line receiving said broadband electrical signals from said fiber node, the other end of said transmission line being connected to an output coupler means, said output coupler means connecting said transmission line to said subscribers.

2. The network according to claim 1 wherein said fiber cable is at least 6 km in length and said cell has a limited cascade including at least one trunk amplifier connected to said node, which limited cascade provides a portion of said line which itself is much less than said 6 km in length.

3. The network according to claim 2 wherein said cell includes a bridger, said limited cascade being connected between said bridger and said node.

4. The network according to claim 3 wherein said cell further comprises an electrical transmission line with line extender amplifiers connected to said bridger for distributing said electrical broadband signal transmitted by said limited cascade, and an output coupler off the subscriber's premises connected to said line having said line extender amplifiers, said subscribers being connected to said output coupler.

* * * * *